April 12, 1960 C. N. SHIPMAN, JR 2,932,696

AUTOMATIC SOUND SEQUENCE SELECTING SYSTEM

Filed Sept. 19, 1957 2 Sheets-Sheet 1

INVENTOR.
CARL N. SHIPMAN, JR

BY Val R. Godaw

ATTORNEY

April 12, 1960 C. N. SHIPMAN, JR 2,932,696

AUTOMATIC SOUND SEQUENCE SELECTING SYSTEM

Filed Sept. 19, 1957 2 Sheets-Sheet 2

INVENTOR.
CARL N. SHIPMAN, JR.
BY Val R. Godlau
ATTORNEY

United States Patent Office 2,932,696

Patented Apr. 12, 1960

2,932,696

AUTOMATIC SOUND SEQUENCE SELECTING SYSTEM

Carl N. Shipman, Jr., Rivera, Calif., assignor to Radio Corporation of America, a corporation of Delaware Application September 19, 1957, Serial No. 684,963

11 Claims. (Cl. 179—100.1)

This invention relates to a sound recording and reproducing system for use in motion picture production. and particularly to an automatic sound sequence selecting system for the re-recording of sound.

In the production of motion pictures each sequence is generally photographed and recorded several times to obtain the best picture and sound sequence. During re-recording the good sound sequences are reproduced simultaneously with other sound tracks which make up the final composite track or record for a particular picture sequence. For instance, a dialogue track or record is recorded during the photographing of a picture sequence, background music and/or sound effects being combined therewith to provide the final composite track or record to accompany the picture. Usually the music sequence is on a separate track or record while the background sequence may be on a third track or record. During the re-recording process, the dialogue, music and background tracks are combined by "mixing" into the composite track. Re-recording is generally accomplished by operators who vary the amplitudes of the various tracks or records in accordance with the scene depicted in the picture sequence. In this combining operation errors occur from time to time because of missed cues and other reasons. The present invention is a system which eliminates the re-recording of the portion or portions of the composite track or record which is defective and to thus combine only the good portions of the re-recorded track or record to obtain the final composite track or record.

The system, therefore, eliminates the re-recording of an entire reel by simply re-recording the satisfactory portions of the reel. It is also adaptable for substituting a foreign language dialogue for any part of an original dialogue. Different types of background tracks may also be automatically shifted into the final composite track. Where control tracks are used for guiding machine elements, errors in portions of the control track may be readily corrected.

The principal object of the invention, therefore, is to facilitate the re-recording of sound records or control tracks.

Another object of the invention is to provide an improved system of re-recording whereby only the satisfactory portions of several sound tracks or records are re-recorded.

A further object of the invention is to provide an improved automatic system for shifting or selecting from a plurality of sound tracks or records certain portions of each to produce a new sound track or record made up of the certain portions.

The novel features which are believed to be characteristic of this invention, both as to the manner of its organization and the mode of its operation, will be better understood from the following description, when read in conjunction with the accompanying drawings, in which.

Figure 1:
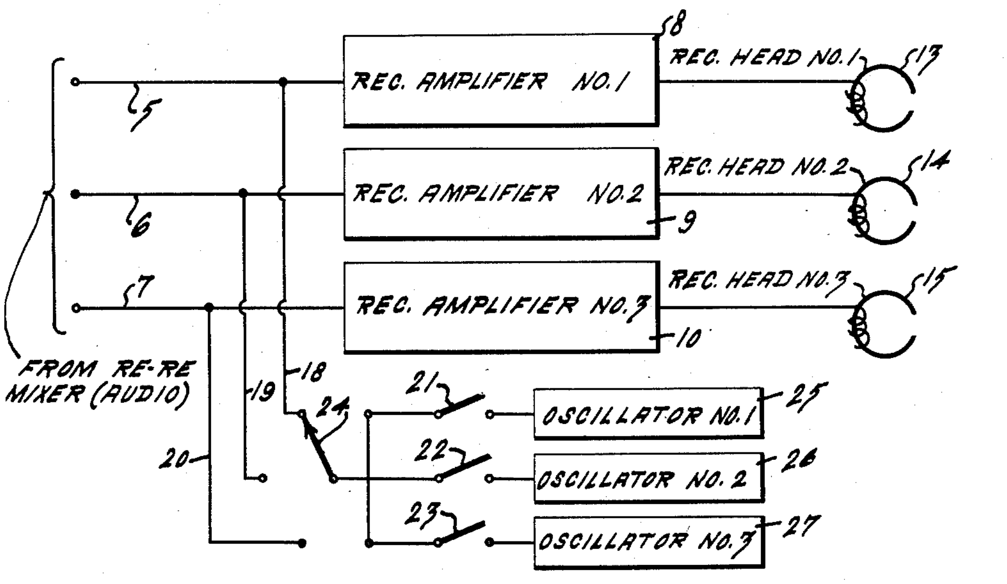
Fig. 1 is a diagrammatic view of the recording portion of a system embodying the invention.

Referring now to the drawings in which single lines are used to represent two or three wire circuits, the outputs of one or more reproducers which are being combined into a composite track may be connected to any one of lines 5, 6, or 7, each of which is connected to a separate amplifier 8, 9, and 10 indicated in Fig. 1 as being recording amplifier No. 1, recording amplifier No. 2, and recording amplifier No. 3. The outputs of these amplifiers are connected to respective recording heads 13, 14, and 15, indicated as recording head No. 1, recording head No. 2, and recording head No. 3.

Bridged across the lines 5, 6, and 7 are lines 18, 19, and 20, which are connected to respective switches 21, 22, and 23 depending upon the position of swinger 24. Connected to the switches 21, 22, and 23 are oscillators 25, 26, and 27, indicated in Fig. 1 as oscillator No. 1, oscillator No. 2, and oscillator No. 3. The recording system of Fig. 1 can record a film a portion of which is shown at 30 in Fig. 3, this film having a row of sprocket holes 31 and a row of sprocket holes 32 with sound track portions indicated as track No. 1, track No. 2, and track No. 3. Other types of film may also be used, magnetic film being preferred. Furthermore, three separate films could be used, synchronization between them being obtained either mechanically or by a self synchronous motor system.

To describe the re-recording operation shown in Fig. 1, it is assumed that line 5 is connected to one or more reproducers to produce composite track or record No. 1 shown as a wavy line 34 on film 30. The wavy line 34 indicates the invisible track or record on magnetic film. It is assumed that after the portion of track No. 1 shown in Fig. 3 has been recorded the portion indicated by the arrow 35 and the letters N.G., meaning "no good," is defective. At this point the reproducers and recorders are turned back to a point prior to the point 36. The reproducers are then started after they are connected to line 6 and the swinger 24 is shifted to line 19. After the reproducers and recorder are up to speed, the switch 22 is momentarily closed and an inaudible tone indicated by the mark 38 will be recorded. The tones from all three oscillators may be three distinct frequencies above audibility, or three distinct frequencies below audibility, such as 33 cycles per second for oscillator No. 1, 39 cycles per second for oscillator No. 2, and 45 cycles per second for oscillator No. 3. For purposes of illustration it is assumed that the tone recorded at 38 is 39 cycles per second.

Since the line 6 is connected to recording head No. 2 to produce track or record No. 2, this record is indicated by the wavy line 39. During the recording of this track any error or defect in track No. 1 could be corrected between the points 36 and 40. After a portion of track beyond point 40 has been recorded, switch 21 is momentarily closed to record a tone mark 42 from oscillator No. 1 which may have a frequency of 33 cycles per second.

To further explain the system it is assumed that during the recording of section 39 of track or record No. 2, another error was made, the error occurring between the points 45 and 46 indicated by the arrow 43 and the letters N.G. In this event the reproducers are again reversed to a point just prior to point 45, the reproducers are connected to line 7 and the swinger 24 is connected to line 20. Now after the reproducers are again started and brought up to speed, switch 23 is momentarily closed and the tone from oscillator No. 3 is recorded at 48, which tone may have a frequency of 45 cycles per second. The track or record No. 3 is then recorded as indicated by the wavy line 50. This recording continues just past point 46 after which switch 22 is momentarily closed to place control tone mark 51 from oscillator No. 2 on track No. 3. Track No. 3 is shown for illustration in the event of an error in track No. 2, it being understood that, if no error was made in track No. 2, track No. 3 is unnecessary.

Figure 2:
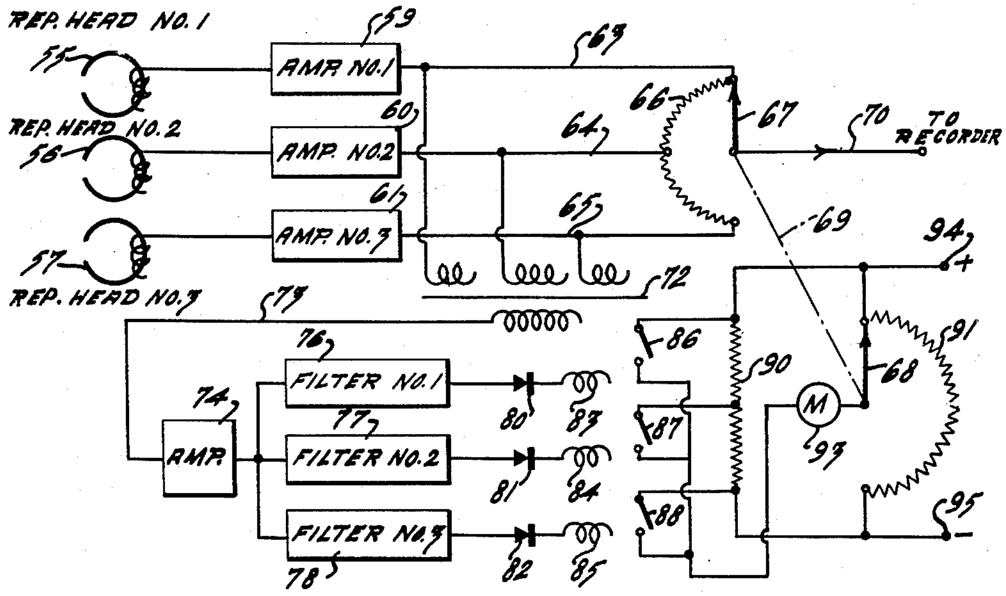
Fig. 2 is a diagrammatic view of the automatic selector portion of the invention.

Now, referring to Fig. 2, three reproducing heads 55, 56, and 57 are indicated as reproducing head No. 1, reproducing head No. 2, and reproducing head No. 3. These heads are connected to respective amplifiers 59, 60, and 61, indicated as amplifier No. 1, amplifier No. 2, and amplifier No. 3. The outputs of the amplifiers are connected by lines 63, 64, and 65 to a potentiometer resistor 66 having a slider 67 mechanically connected to a slider 68 as indicated by the broken line 69. The output line 70 connected to slider 67 may be connected to a final single track recorder.

Bridged across lines 63, 64, and 65 are three primaries of a transformer 72, the secondary of which is connected to line 73 which in turn is connected to an amplifier 74. The output of amplifier 74 is simultaneously impressed on filters 76, 77, and 78 indicated as filter No. 1, filter No. 2, and filter No. 3 each of which is tuned to one of the frequencies of the oscillators 25, 26, and 27. The outputs of the filters are connected respectively to rectifiers 80, 81 and 82 which in turn are connected to respective relay coils 83, 84, and 85 which have respective swingers 86, 87, and 88 connected across a resistor 90.

Slider 68 is adapted to travel over a resistor 91. This resistor and resistor 90 constitute a direct current bridge circuit, a null-seeking motor 93 moving slider 68 over resistor 91, and slider 67 over resistor 66, the motor being powered from any suitable power source connected to terminals 94 and 95.

Figure 3:
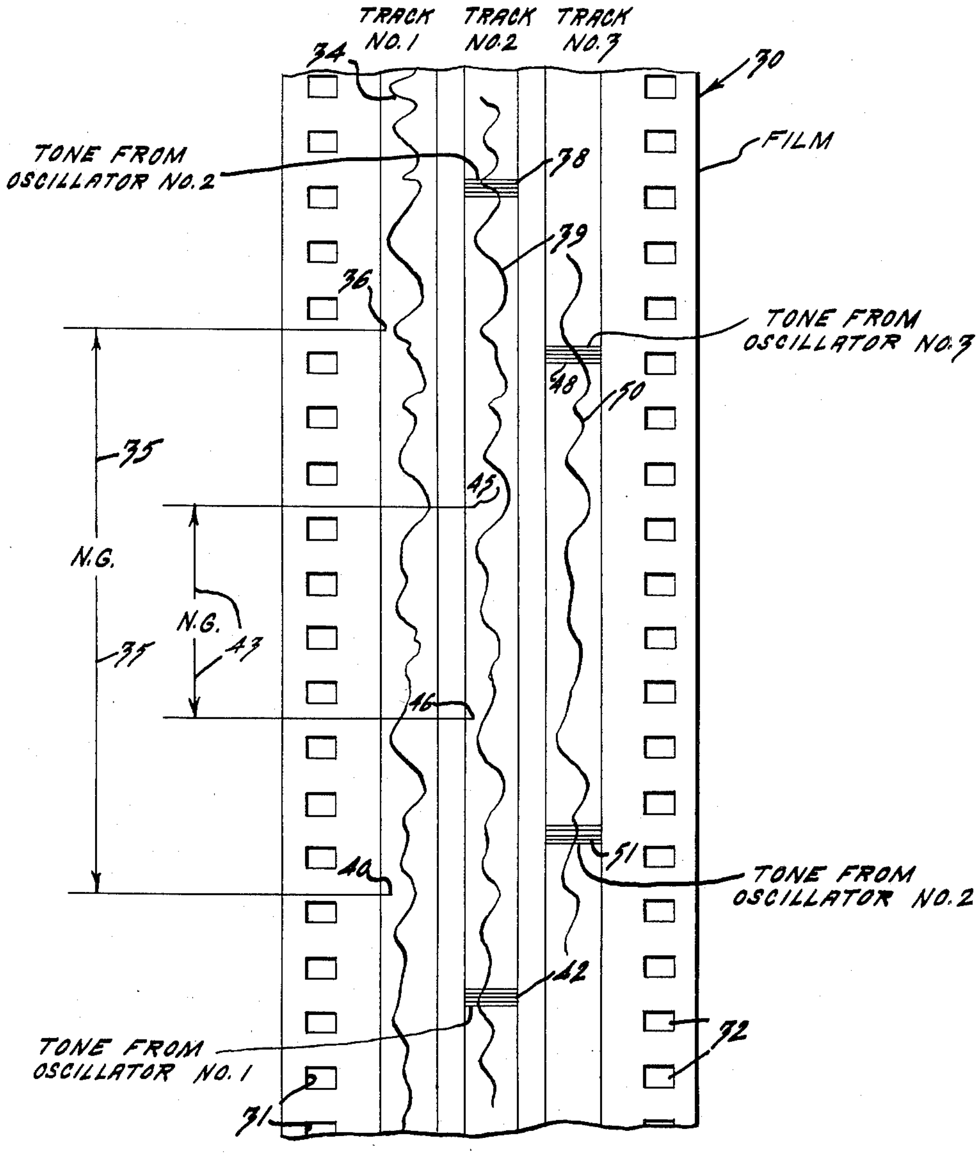
Fig. 3 is a partial section of a triple track sound film which may be used in the invention.

The portion of the system shown in Fig. 2 functions by having the heads 55, 56, and 57 reproduce respective tracks or records No. 1, No. 2 and No. 3 or any one or two of the tracks or records depending upon which track or record area has a signal present. Assuming that the portion of the film shown in Fig. 3 is being reproduced, track No. 1 will be detected by head 55 and the output will be transmitted by slider 67 to line 70. Now, when the film 30 has advanced to the tone mark 38 of track No. 2, this tone will be impressed over transformer 72 on filters 76, 77, and 78, but will only be transmitted by filter 77 which is tuned to pass 39 cycles per second. The output of filter 77 will be rectified by rectifier 81 which will cause swinger 87 to close its circuit. This will unbalance the bridge 90—91 and the motor 93 will move its slider 68 to the central point on resistor 91 and simultaneously move slider 67 to the mid-point on resistor 66 to connect line 64 to line 70. As the slider 67 moves to the mid-point on resistor 66, sound track No. 1 will be faded out and sound track No. 2 faded in so that, at point 36 on track No. 1, only track No. 2 will be connected to line 70.

Re-recording will then continue from track No. 2 and if no track No. 3 were on film 30 it would continue to tone mark 42. When tone mark 42 is reached, filter 76 will transmit the tone mark 42 of 33 cycles per second which will cause swinger 86 to close its circuit. This will return sliders 67 and 68 to the points shown in Fig. 2 and track No. 2 will be faded out and track No. 1 faded in.

However, with track No. 3 on film 30, reproducing head 57 will pick up tone 48 of 45 cycles per second which will be transmitted by filter No. 3 causing swinger 88 to close its circuit. This will unbalance the bridge 90—91 causing sliders 67 and 68 to be moved to the other end of their respective resistors from that shown in the drawing. This will cause track No. 2 to be faded out and track No. 3 to be faded in and track No. 3 will be re-recorded until the tone mark 51 comes under the reproducing head 57. The tone from this mark will be transmitted by filter No. 2 to cause swinger 87 to close its circuit. The sliders 67 and 68 are then moved by motor 93 to the central points on their respective resistors and track No. 3 will be faded out and track No. 2 faded in. When pickup head No. 2 reaches tone mark 42 track No. 2 will be faded out and track No. 1 will be faded in as described above. If tone mark 51 was from oscillator No. 1 then track No. 3 could be faded out and track No. 1 simultaneously faded in.

The above recording and automatic selective reproducing system will thus permit the re-recording of only the satisfactory portions of a sound track or record, thus eliminating the necessity for re-recording an entire film reel which may run anywhere from 500 to 2,000 feet. It thus expedites the re-recording operation and provides a better overall final composite track or record than when the operation is all done manually. As also mentioned above, it may be used to substitute certain portions of a sound track or record in one language with portions from another language by simply having the foreign version records in the different track areas. The automatic switch operation can be accomplished during normally silent sections of the sound tracks. For producing a control track for machine elements the same corrections may be made during the production of the final control track.

I claim:

1. A re-recording system for automatically selecting in serial order portions of different records on a record medium for subsequently combining into a single record comprising a plurality of record detectors, a plurality of corresponding means for transmitting currents corresponding to said detected records to a common point, each of said records being adapted to have a control tone therein, means for connecting said common point to any one of said transmitting means at mutually exclusive times to record certain selected portions of said different records in serial order, and means under control of said control tones for shifting said connecting means from one to another of said transmitting means.

2. A re-recording system in accordance with claim 1 in which said connecting means includes a resistor interconnecting the outputs of said transmitting means and a contactor adapted to move over said resistor, said contactor being said common point and moved from one to another of said transmitting means by said last-mentioned shifting means.

3. A re-recording system in accordance with claim 1 in which said last-mentioned means including a plurality of filters, each adapted to transmit a certain one of said control tones, and a motor connected to said connecting means, means for energizing said motor, the amount of energization of said motor being controlled by said control tones transmitted by said filters.

4. A re-recording system in accordance with claim 1 in which said last-mentioned means includes a motor connected to said connecting means, means for energizing said motor, a bridge circuit over which said motor is energized, and a plurality of relays for changing the balance of said bridge circuit, said relays being actuated by said control tones.

5. A re-recording system in accordance with claim 4 in which a plurality of filters interconnecting said record detectors and said relays, each of said filters passing one of said control tones to actuate their respective relay connected thereto.

6. An automatic selector system for re-recording a plurality of separate tracks on a first track medium into a single track on a second track medium at mutually exclusive times comprising a plurality of recording channels for recording into a plurality of separate tracks on said first track medium the same portion of certain signals at mutually exclusive times, means for recording control tones on said first track medium, a different control tone being recorded at the beginning and end of each of said tracks, a plurality of detecting means for simultaneously detecting said tracks on said first track medium, said control tones also being detected by said detecting means, a recorder for said second track medium, and means for connecting at mutually exclusive times each of said detecting means to said recorder, said control tones selecting the particular track from said first track medium for recording.

7. An automatic selector system in accordance with claim 6 in which said connecting means includes a terminating resistor to which said detecting means are connected at different points thereon to connect each of said detecting means to said recorder, and means connected to said recorder and movable over said resistor to fade between said tracks on said first track medium.

8. An automatic selector system in accordance with claim 7 in which motor means are provided for moving said means movable over said resistor, together with a bridge circuit to which said motor is connected, energizing means for said motor, and means for unbalancing sad bridge circuit by said control tones to energize said motor.

9. An automatic selector system in accordance with claim 8 in which said last-mentioned means includes a plurality of filters, each filter transmitting only one of said control tones, a rectifier for each filter and connected thereto, and a relay for each rectifier and connected thereto, said relays being connectable to said bridge circuit to unbalance said bridge circuit.

10. A system for automatically selecting certain signal tracks on a signal track medium for re-recording in serial order comprising means for recording a plurality of tracks on said signal track medium, means for recording on said medium together with said tracks control signals adjacent the beginning and end of certain of each of said tracks, means for simultaneously translating said tracks into corresponding electrical currents, said translating means also translating said recorded control signals into corresponding electrical currents, a separate circuit for the electrical currents from each of said translating means of each of said tracks, a recorder, adjustable means for connecting said recorder to one of said circuits at any one time, means for selecting the currents of a particular control signal, and means for utilizing the selected currents of a particular control signal for actuating said adjustable means.

11. A system in accordance with claim 10 in which said last-mentioned means includes a bridge circuit, a motor in said bridge circuit for actuating said adjustable means, a filter for each of said control signal currents, and a relay for each of said filters, actuation of said relays unbalancing said bridge circuit for energizing said motor.

References Cited in the file of this patent

UNITED STATES PATENTS

| | | |
|---|---|---|
| 2,702,315 | Roderick | Feb. 15, 1955 |
| 2,768,242 | Weber | Oct. 23, 1956 |
| 2,792,449 | Bottini | May 14, 1957 |